(12) United States Patent
Chen et al.

(10) Patent No.: US 7,068,604 B2
(45) Date of Patent: Jun. 27, 2006

(54) MANAGING MEMORY RESIDENT QUEUES TO CONTROL RESOURCES OF THE SYSTEMS USING THE QUEUES

(75) Inventors: Shawfu Chen, New Milford, CT (US); Robert O. Dryfoos, Hopewell Junction, NY (US); Allan Feldman, Poughkeepsie, NY (US); David Y. Hu, Poughkeepsie, NY (US); Jason A. Keenaghan, Wappingers Falls, NY (US); Peter A. Lewis, Jacksonville, FL (US); Peter G. Sutton, Lagrangeville, NY (US); Mei-Hui Wang, Brookfield, CT (US); Alice M. Williams-Obleton, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 09/938,031

(22) Filed: Aug. 23, 2001

(65) Prior Publication Data
US 2003/0041115 A1 Feb. 27, 2003

(51) Int. Cl.
*H04J 1/16* (2006.01)
(52) U.S. Cl. .................................... 370/235
(58) Field of Classification Search ........ 370/428, 370/411, 412, 413–419, 229–231, 389, 401; 714/15
See application file for complete search history.

(56) References Cited

U.S. PATENT DOCUMENTS

| | | | |
|---|---|---|---|
| 5,133,053 A | 7/1992 | Johnson et al. | 395/200 |
| 5,455,820 A * | 10/1995 | Yamada | 370/395.71 |
| 5,465,328 A * | 11/1995 | Dievendorff et al. | 714/15 |
| 5,680,539 A | 10/1997 | Jones | 395/182.04 |
| 5,805,589 A * | 9/1998 | Hochschild et al. | 370/389 |
| 5,841,722 A * | 11/1998 | Willenz | 365/221 |
| 5,907,673 A | 5/1999 | Hirayama et al. | 395/182.14 |
| 6,078,944 A | 6/2000 | Enko et al. | 709/105 |
| 6,341,302 B1 * | 1/2002 | Celis | 718/100 |
| 6,606,301 B1 * | 8/2003 | Muller et al. | 370/230 |

FOREIGN PATENT DOCUMENTS

JP 11328003 11/1999

* cited by examiner

*Primary Examiner*—Dang Ton
(74) *Attorney, Agent, or Firm*—Blanche E. Schiller; Heslin Rothenberg Farley & Mesiti P.C.

(57) ABSTRACT

Memory resident queues are monitored at predefined time intervals. When the monitoring indicates that a particular queue is not being serviced at a desired level, then action is taken to sweep one or more messages from the queue. The sweeping of the messages frees up system resources associated with the messages, thus allowing other tasks to be serviced. If, after the sweeping, it is determined that the queue can handle additional messages, then one or more messages are placed back on the queue.

48 Claims, 7 Drawing Sheets fig. 1A fig. 1B fig. 2 fig. 3 fig. 4 fig. 5 fig. 6 fig. 7

MANAGING MEMORY RESIDENT QUEUES TO CONTROL RESOURCES OF THE SYSTEMS USING THE QUEUES

CROSS-REFERENCE TO RELATED APPLICATIONS

This application contains subject matter which is related to the subject matter of the following application, which is assigned to the same assignee as this application. The below listed application is hereby incorporated herein by reference in its entirety:

"HIGH-PERFORMANCE MEMORY QUEUE", Chen et al., Ser. No. 09/790,853, filed Feb. 22, 2001, and published on Aug. 22, 2002, as Pub. No. US 2002/0116538 A1.

TECHNICAL FIELD

This invention relates, in general, to network messaging and queuing, and in particular, to managing memory resident queues to control resources of the systems using the queues for messaging.

BACKGROUND OF THE INVENTION

One technology that supports messaging and queuing across a network is referred to as MQSeries and is offered by International Business Machines Corporation, Armonk, N.Y. With MQSeries, users can dramatically reduce application development time by using MQSeries API functions. Since MQSeries supports many platforms, MQSeries can be ported easily from one platform to another. In a network, two MQSeries systems communicate with each other via channels, such as MQSeries channels. An MQSeries sender channel defines a connection from one MQSeries system to another MQSeries system and transmits messages from the one system to the other system.

To facilitate transmission of messages from one system to another system, memory resident queues are used. In particular, messages are written to and retrieved from the queues. Since the messages in the queues occupy system resources, such as system work blocks, it is very likely that in a high-performance, high-throughput system, a system will run out of resources, when a queue is stalled or when a communications channel is congested or stopped. If the system does run out of resources, then the system itself will be stalled and may need to be brought down.

Based on the foregoing, a need exists for a capability that manages queues to avoid an undesirable condition. In particular, a need exists for a queue management capability that detects when messages are to be removed from a queue, thereby freeing up resources associated with the queue and enabling a system to continue to provide services to other tasks and to avoid a shutdown condition.

SUMMARY OF THE INVENTION

The shortcomings of the prior art are overcome and additional advantages are provided through the provision of a method of managing memory resident queues. The method includes, for instance, determining whether a memory resident queue is being serviced at a desired level; and removing one or more messages from the memory resident queue in response to a determination that the memory resident queue is not being serviced at the desired level.

System and computer program products corresponding to the above-summarized methods are also described and claimed herein.

Advantageously, a capability is provided which detects whether a queue is being serviced at a desired level, and when the queue is not being serviced at such a level, measures are taken to free up some of the system resources associated with that queue. This enables the system to remain running and to provide services to other tasks of the system.

Additional features and advantages are realized through the techniques of the present invention. Other embodiments and aspects of the invention are described in detail herein and are considered a part of the claimed invention.

DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided which determines whether a particular queue is being serviced adequately and the actions to be taken in response to the determination. For instance, if the queue is not being adequately serviced, then one or more messages are removed from the queue to free up system resources associated with the queue. The removal of messages from the queue is referred to herein as sweeping the queue. On the other hand, if the queue can service more messages, then one or more messages are added to the queue. This is referred to herein as unsweeping the queue. (The removing or adding (or similar operations) to a queue refers to the removing from or adding to the memory portion of the queue. Thus, when messages are removed from the queue, as one example, the messages are removed from the memory portion and placed on the storage portion of the queue. Similarly, when messages are added to the queue, they are taken from the storage portion of the queue, and placed in the memory portion.)

Figure 1A:
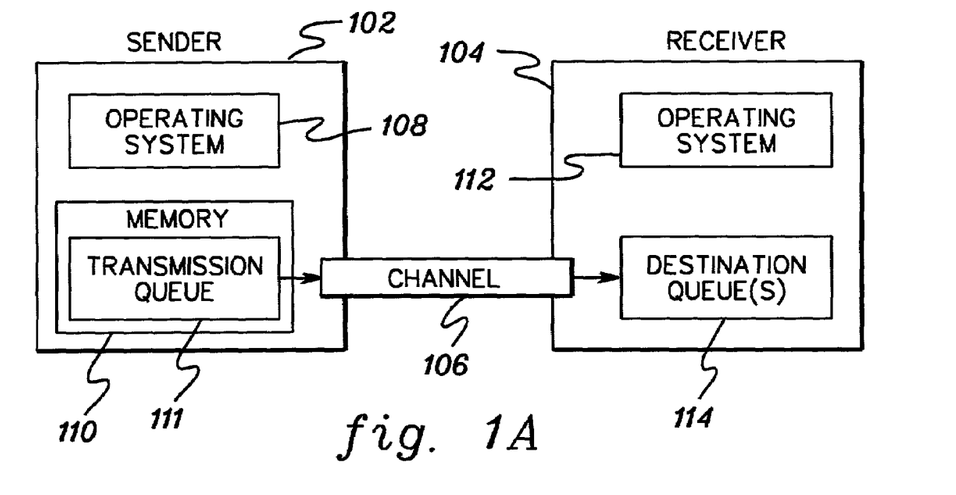
FIG. 1a depicts one embodiment of a communications environment incorporating and using one or more aspects of the present invention.

One embodiment of a communications environment incorporating one or more aspects of the present invention is depicted in FIG. 1a. As shown in FIG. 1a, a communications environment 100 includes, for instance, a sender 102 coupled to a receiver 104 via one or more channels 106. In one example, sender 102 is a computing unit having an operating system 108, such as the TPF Operating System offered by International Business Machines Corporation, Armonk, N.Y., and a local memory 110. The local memory includes one or more queues 111 used for messaging. In one example, the one or more queues are transmission queues, which include messages to be transmitted to receiver 104.

Receiver 104 is also a computing unit, as one example. It includes an operating system 112, such as the TPF Operating System, and one or more destination queues 114 for receiving messages transmitted from sender 102.

In one embodiment, channel 106 is a sender channel, and is based, for instance, on MQSeries, offered by International Business Machines Corporation, Armonk, N.Y. MQSeries is described in a publication entitled, *MQSeries Intercommunication*, IBM Publication No. SC33-1872-03 (March 2000), which is hereby incorporated herein by reference in its entirety.

Figure 1B:
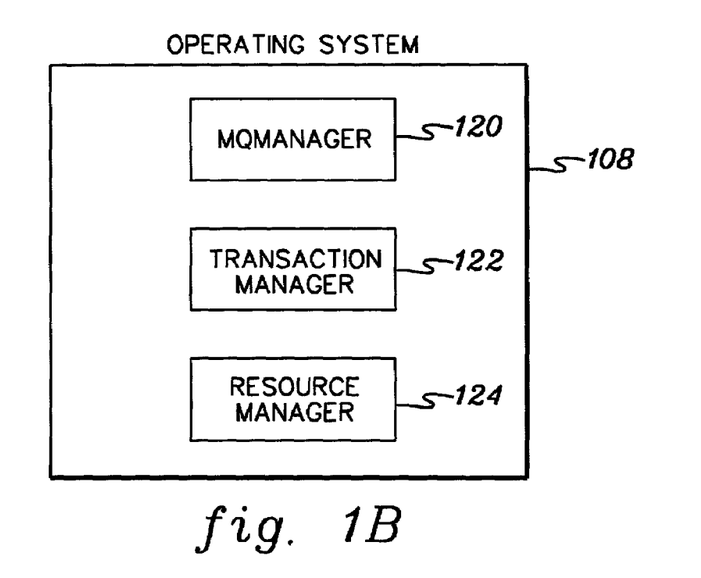
FIG. 1b depicts one example of various components of an operating system of FIG. 1a, in accordance with an aspect of the present invention.

Further details regarding operating system 108 are described with reference to FIG. 1b. Operating system 108 includes various components used to control aspects of messaging. In one example, these components include an MQManager 120 used in managing the placing of messages on a queue and the retrieving of messages from a queue; a transaction manager (TM) 122 used in controlling the initiation of commit and/or rollback operations; and a resource manager 124 used in controlling the locking of a queue during commit processing.

In one embodiment, the one or more queues being managed are queues located within local memory, referred to herein as memory resident queues. As one example, a memory resident queue 200 (FIG. 2) includes a plurality of components, such as, for instance, a front message list 202, a swept list 204, and a rear message list 206. The front message list includes a pointer to a first message 208 of a chain of one or more messages of the head of the queue; and the rear message list includes a pointer to a message 210 of a chain of one or more messages at the tail of the queue. The content of each message is included in one or more system work blocks (SWBs), each of which is 1,024 bytes in length, as one example. The swept list may include a pointer to a first identifier 212 (e.g., a PID) in a chain of one or more identifiers. If there is no pointer in the swept list, then the queue has not been swept.

Figure 2:
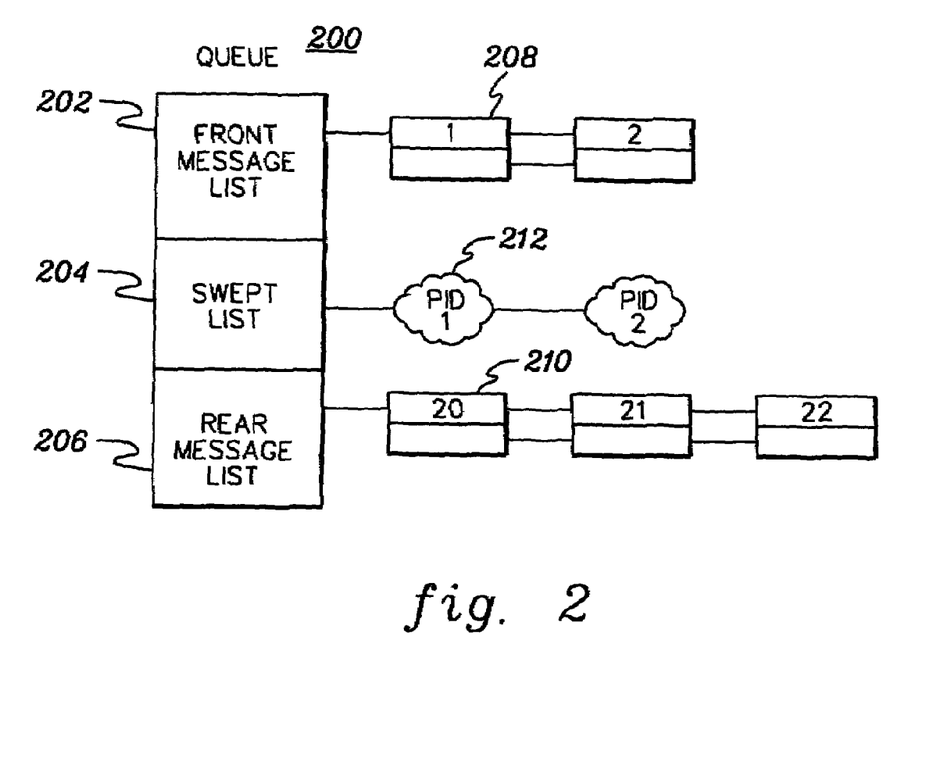
FIG. 2 depicts one embodiment of a memory resident queue, in accordance with an aspect of the present invention.

In accordance with an aspect of the present invention, a queue, such as memory resident queue 200, is monitored to determine whether it is being serviced appropriately, and if it is not being serviced appropriately, then messages are swept from the queue in order to release system resources, such as system work blocks associated with the messages. The release of the system work blocks enables the system to provide services to other tasks and to avoid a shut down situation due to a lack of system resources.

In one embodiment, the logic associated with managing the queues references various counts, such as a get count and a message count. Thus, prior to describing the management logic, the relevant counts are discussed. As one example, each time a get message, such as an MQGet message, is processed, a get count indicating a number of GET messages serviced in a defined interval, and a message count indicating a number of overall messages (e.g., GET and PUT messages) serviced in the defined interval, are updated. One embodiment of the logic associated with updating the counts is described with reference to FIG. 3. In one example, this logic is executed by MQManager 120.

Figure 3:
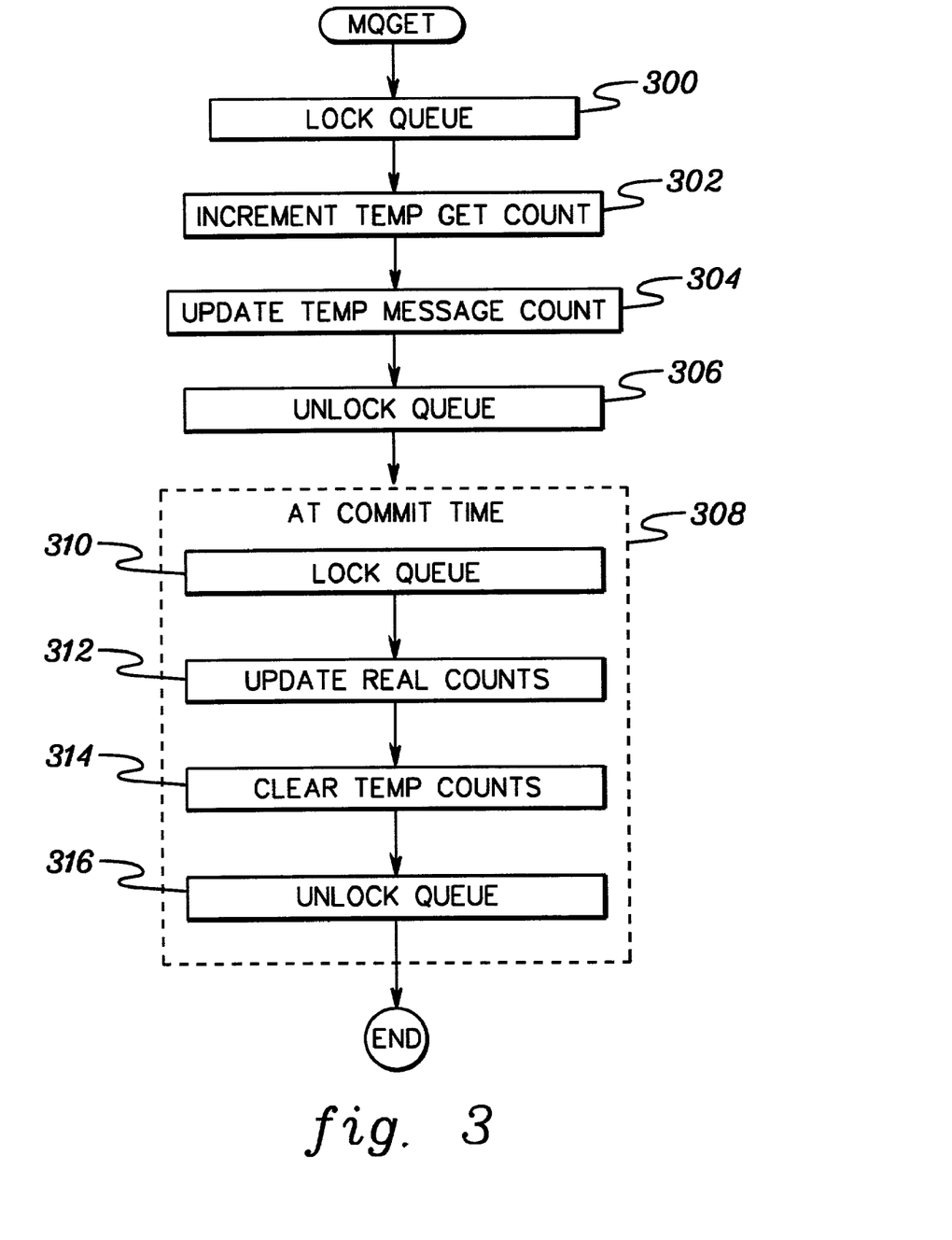
FIG. 3 depicts one embodiment of the logic associated with updating various counts used in the management logic of an aspect of the present invention.

Initially, the queue to be affected by the GET message is locked, via, for instance, a lock word, STEP 300, and a temporary get count and a temporary message count are incremented by one, STEPS 302, 304. Thereafter, the queue is unlocked, STEP 306.

Subsequently, at commit time, various actions are taken, STEP 308. As one example, the queue is locked again, STEP 310, and the real (i.e., non-temporary) counts, which are stored within the queue, are adjusted, STEP 312. For example, the value of temp get count is added to a count of GETS (#GET) and the value of temp message count is added to a count of messages (#MSGS). (As is known, there may be more than one GET prior to commit time. Thus, the counts reflect each of the GET messages.) Thereafter, the temporary counts are cleared, STEP 314, and the queue is unlocked, STEP 316. This concludes the processing associated with updating the relevant counts, when an MQGet message is processed.

In addition to the above, the message count is similarly updated when other messages are processed against the queue, including, for instance, PUT messages.

The get and message counts are used, in accordance with an aspect of the present invention, to make various decisions relating to managing the queues. One embodiment of the logic associated with managing one or more queues is described with reference to FIGS. 4–7. In one example, this logic is executed by MQManager 120 (FIG. 1b). For example, MQManager executes one or more processes that are responsible for various aspects of the present invention.

Figure 4:
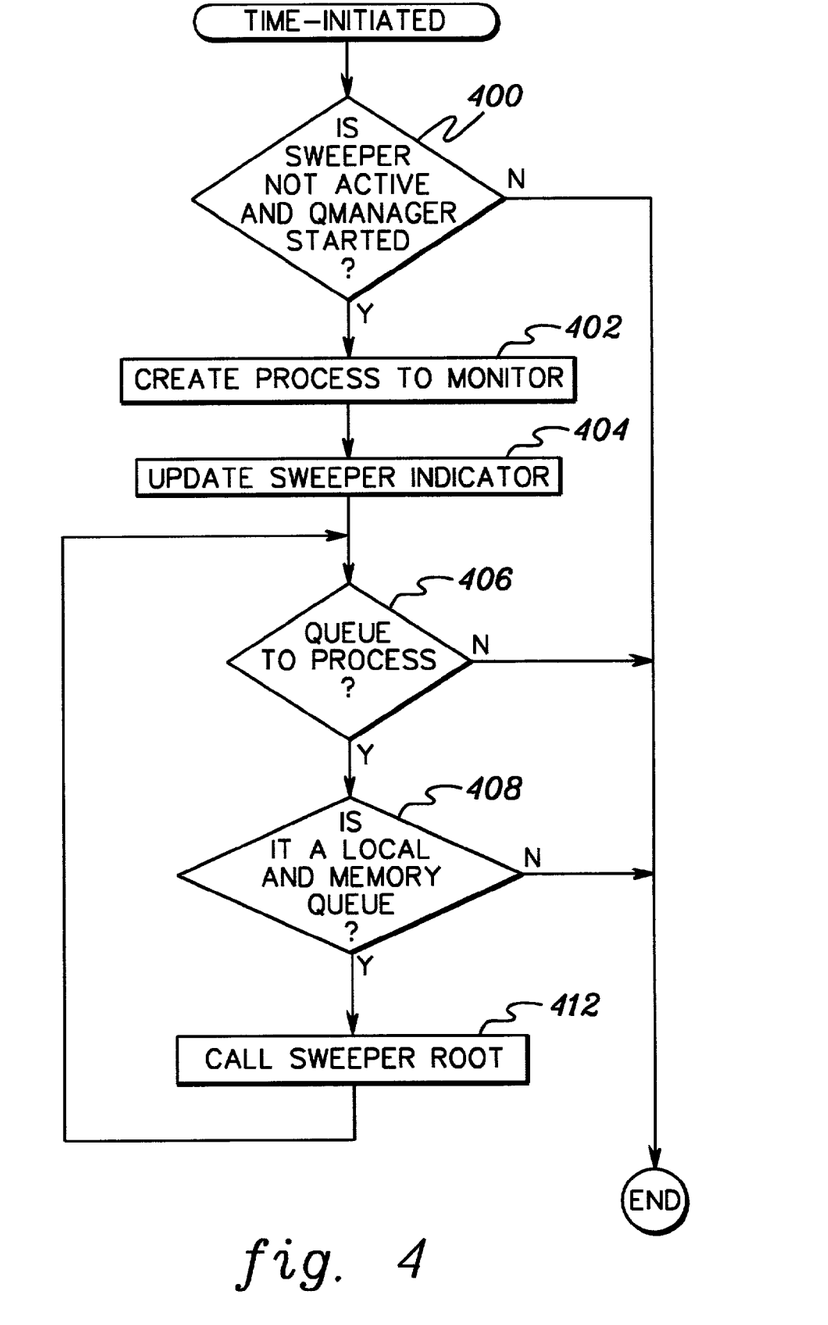
FIG. 4 depicts one embodiment of the logic associated with selecting a queue to be managed, in accordance with an aspect of the present invention.

Referring to FIG. 4, a time-initiated process is invoked in order to determine whether there is a queue to be managed. In one example, the time-initiated process is invoked at predefined time intervals (e.g., every five seconds).

When the time-initiated process is invoked, a determination is made as to whether a sweeper process is active and the queue manager (e.g., MQManager 120) has been started, INQUIRY 400. If there is already an active sweeper process, as indicated by a sweeper indicator, and/or the queue manager is not started, then processing is complete.

However, if the sweeper is not active and the queue manager is started, then a process is created, which is responsible for monitoring the memory resident queues and handling the logic of FIG. 4, STEP 402.

Initially, the monitoring process updates a sweeper indicator located in an MQProfile control block to indicate that a sweep is in process, STEP 404. In one example, in order to update the sweeper indicator, the MQProfile is locked, and then, once the sweeper indicator is updated, the MQProfile is unlocked.

Thereafter, a determination is made as to whether there is a queue to process, INQUIRY 406. For example, a determination is made as to whether there is a queue that has not been monitored during this time interval. If there are no queues to process, then processing is complete. However, if there is a queue to process, then a determination is made as to whether the selected queue is of a particular type, INQUIRY 408. In one example, a determination is made as to whether the queue is a local and memory queue. If the queue is not of the defined type, then processing is complete.

However, if the queue is a local and memory queue, then processing continues by calling a sweeper root module to determine whether the selected queue is to be swept, STEP 412. Thereafter, processing continues with INQUIRY 406 to determine whether there is another queue to be processed.

Figure 5:
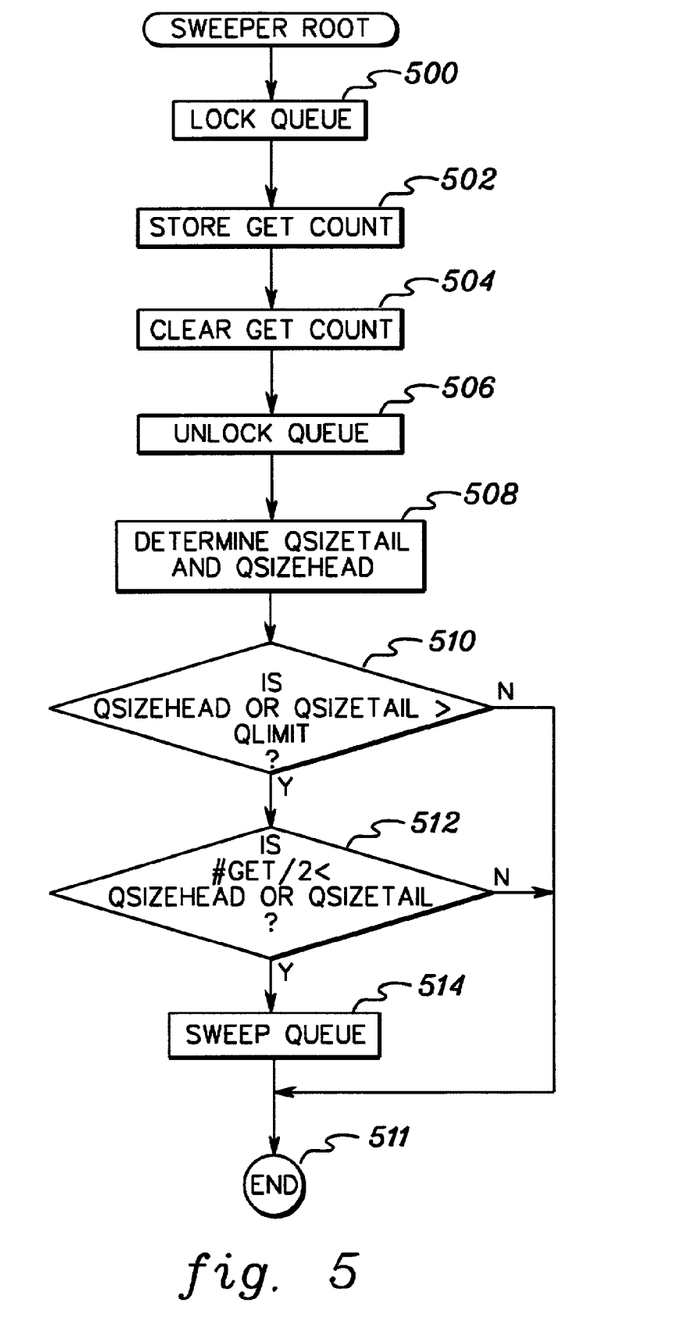
FIG. 5 depicts one embodiment of the logic associated with determining whether messages are to be removed from the queue of FIG. 4, in accordance with an aspect of the present invention.

One embodiment of the logic associated with the sweeper root module is described with reference to FIG. 5. Initially, the selected queue is locked, STEP 500. Then, the number of GET messages being serviced for the queue is obtained from the get count (#GET) and stored in local memory for later processing. This enables the count to be used without keeping the queue locked for the entire process. Thereafter, the get count is cleared, STEP 504, and the queue is unlocked, STEP 506.

Subsequently, a determination is made as to the size of the tail of the queue (QSIZETAIL) and the size of the head of the queue (QSIZEHEAD), STEP 508. In one example, this determination is made by referencing counters that keep track of the number of messages on the tail and the head of the queue, respectively.

Next, a determination is made as to whether QSIZEHEAD or QSIZETAIL is greater than a Qlimit, INQUIRY 510. In one example, the Qlimit represents a predefined number of messages, such as 1000 messages. Should both QSIZEHEAD and QSIZETAIL be less than or equal to Qlimit, then the queue is not swept and processing is complete, STEP 511. However, if either QSIZEHEAD or QSIZETAIL is greater than Qlimit, then a further determination is made as to whether the number of get messages (#GET) divided by two is less than QSIZEHEAD or QSIZETAIL, INQUIRY 512.

If half of the number of GETS is not less than QSIZEHEAD or QSIZETAIL, then processing is complete, STEP 511. However, if the number of GETS divided by two is less than QSIZEHEAD or QSIZETAIL, then the sweeping process continues, STEP 514.

Figure 6:
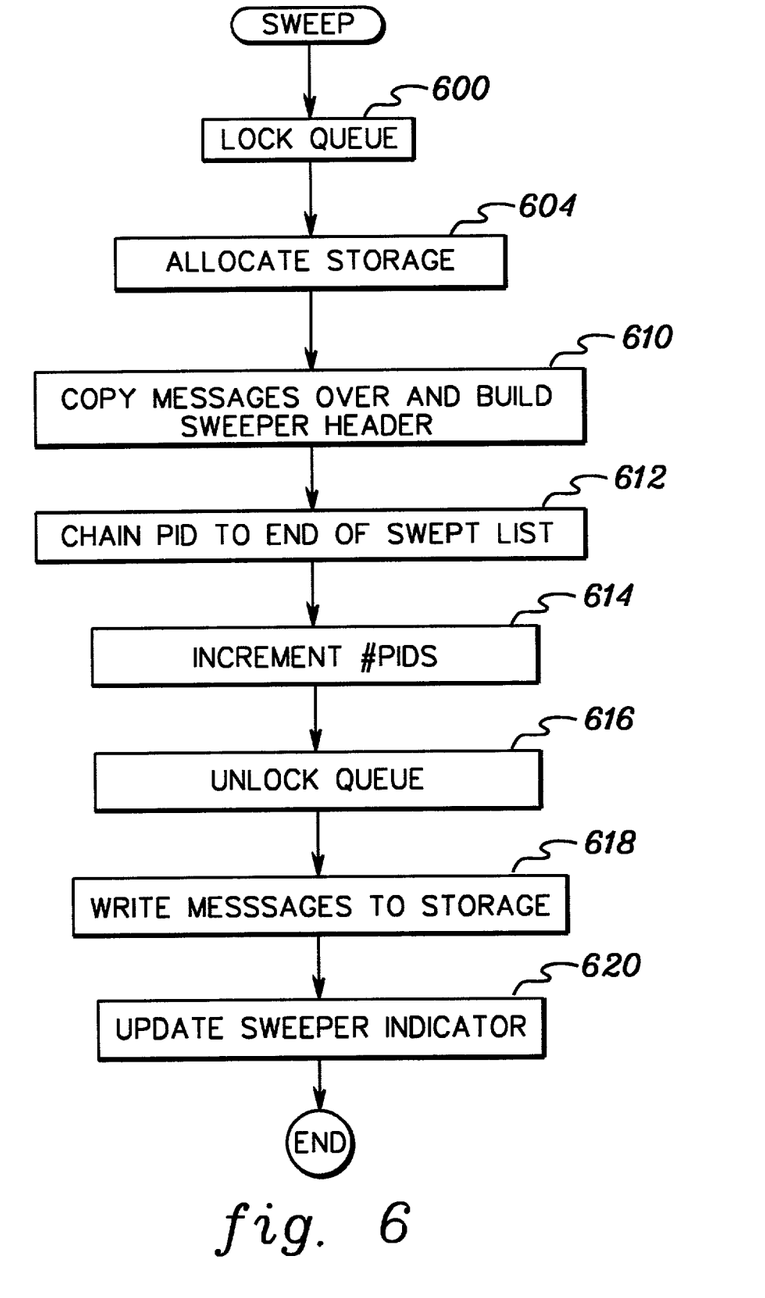
FIG. 6 depicts one embodiment of the logic associated with removing the messages, in accordance with an aspect of the present invention.

One embodiment of the logic associated with sweeping the queue is described with reference to FIG. 6. Initially, the queue is locked, STEP 600, and then one or more areas of storage are allocated, STEP 604. In one example, the storage to be allocated is based on whether the tail, the head or both are to be swept. If the tail is to be swept (i.e., QSIZETAIL is greater than QLIMIT), then an area of storage is allocated for all of the committed messages in the queue tail except one. Similarly, if the head is to be swept, then another area of storage is allocated for half of the number of GET messages being serviced or for all but five of the messages in the queue head, whichever is greater. (Other allocations are possible.)

Subsequent to allocating the one or more areas of storage, messages are copied from the queue (either the tail, the head or both, as appropriate) to the respective areas of allocated storage, such that the messages in each area are stored contiguously. Further, a sweeper header for each area of allocated storage is built, STEP 610. In one example, the sweeper header indicates the number of messages copied into the area and a total length of the messages. Thereafter, an identifier (such as a PID obtained from the TPF operating system), which identifies this set of messages being swept, is chained to the end of the swept list, STEP 612, and a counter (e.g., located with the queue) of the number of PIDS is incremented by one, STEP 614. Subsequently, the queue is unlocked, STEP 616.

Next, the messages copied to the allocated storage are written to one or more storage media, such as to one or more direct access storage devices (DASD), STEP 618, and the sweeper indicator is updated to indicate that the sweep is complete, STEP 620. This concludes processing of the sweep process.

In accordance with a further aspect of the present invention, an unsweep process may be performed, when the number of messages in the front list (i.e., the head) of the queue is running low. In one example, the unsweep logic is executed when an MQget command is invoked. One embodiment of the logic associated with the unsweep process is described with reference to FIG. 7.

Figure 7:
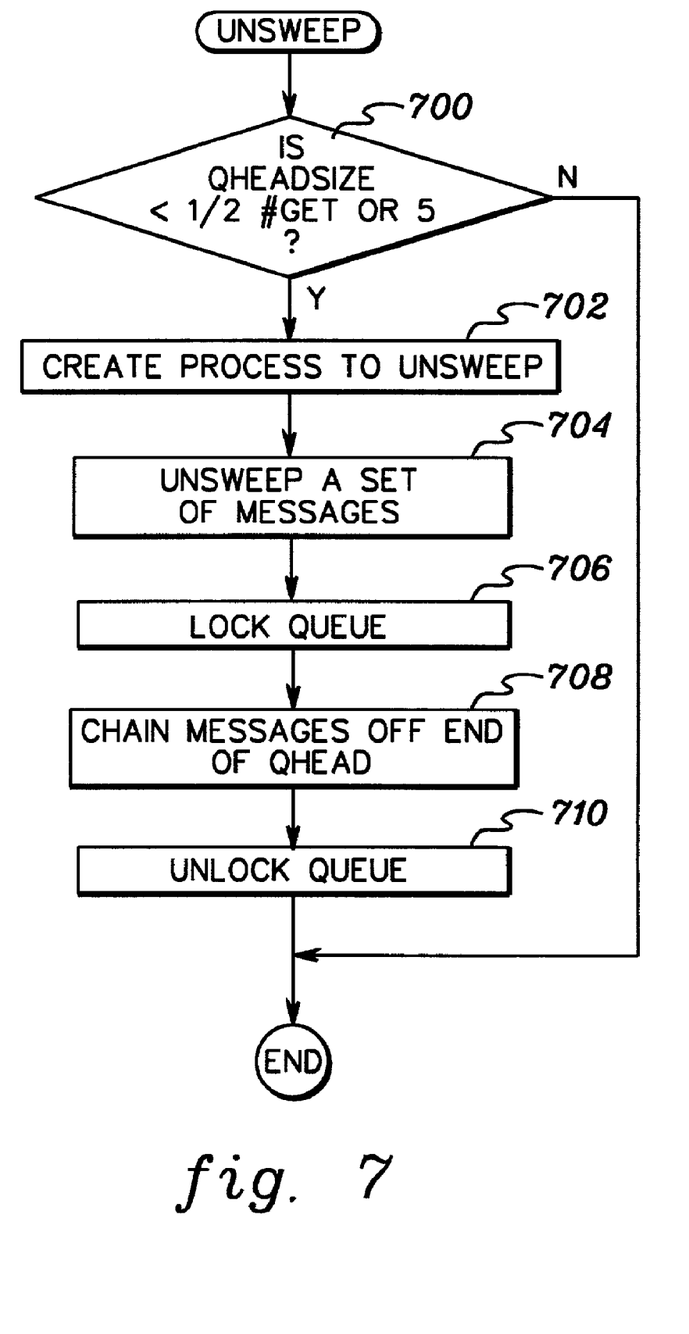
FIG. 7 depicts one embodiment of the logic associated with placing messages back on a queue, in accordance with an aspect of the present invention.

Initially, a determination is made as to whether QHEADSIZE is less than half of the number of GET messages or a predefined value, such as five, INQUIRY 700. If not, then the unsweep process is not executed. However, if QHEADSIZE is less than half of the number of GET messages or less than five, then an unsweep process is created to manage the placing of the messages back on the queue, STEP 702.

In one example, the unsweep process unsweeps a set of messages, STEP 704. That is, the unsweep process retrieves from storage a set of messages corresponding to a selected PID (e.g., the last PID on the swept list, the first PID on the list, or a randomly selected PID from the list).

Subsequently, the queue is locked, STEP 706, and the messages are chained off of the end of the head of the queue, STEP 708. The queue is then unlocked, STEP 710. This concludes processing associated with unsweeping messages for a queue.

Described in detail above is a capability for managing queues, such that the use of system resources is controlled. For example, the queues are monitored, and if it is determined that a queue is not being serviced adequately, then the queue is swept, until, for instance, movement of the queue is adequate. This allows system resources to be freed and to be used to provide services to other tasks. It also assists in avoiding a shut down condition.

Although the examples provided herein describe using aspects of the invention for memory resident transmission queues, it can also be used for other memory resident queues. Further, aspects of the invention are applicable for systems other than those using MQSeries.

The communications environment described above is only one example. For instance, although the operating system is described as TPF, this is only one example. Various other operating systems can be used. Further, the operating systems in the different computing environments can be heterogeneous. The invention works with different platforms. Additionally, the invention is usable by other types of environments.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing memory resident queues, said method comprising:
   determining whether a memory resident queue is being serviced at a desired level;
   removing one or more messages from the memory resident queue to storage in response to a determination that the memory resident queue is not being serviced at the desired level; and
   returning at least one message of the one or more removed messages to the memory resident queue;
   wherein the at least one message comprises a set of one or more messages associated with a selected swept identifier.

2. The method of claim 1, wherein the removing of the one or more messages causes one or more resources associated with the memory resident queue to be freed.

3. The method of claim 1, wherein said returning is performed in response to a determination that the memory resident queue can accept additional messages.

4. The method of claim 1, wherein the desired level takes into consideration a fullness level of the memory resident queue.

5. A method of managing memory resident queues, said method comprising:
   determining whether a memory resident queue is being serviced at a desired level, wherein the determining comprises:
      determining whether a size of at least one component of the memory resident queue satisfies a first criterion; and
      determining whether a specified portion of messages of a defined type satisfies a second criterion, wherein the memory resident queue is not being serviced at the desired level when the first and second criterion are satisfied; and
   removing one or more messages from the memory resident queue in response to a determination that the memory resident queue is not being serviced at the desired level.

6. The method of claim 5, wherein the at least one component comprises at least one of a head of the memory resident queue and a tail of the memory resident queue.

7. The method of claim 6, wherein the first criterion comprises being greater than a defined limit of the memory resident queue.

8. The method of claim 5, wherein the specified portion of messages of the defined type comprises one half of a number of get messages.

9. The method of claim 8, wherein the second criterion comprises being less than at least one of a size of a head of the memory resident queue and a size of a tail of the memory resident queue.

10. A method of managing memory resident queues, said method comprising:
    determining whether a memory resident queue is being serviced at a desired level; and
    removing one or more messages from the memory resident queue to storage in response to a determination that the memory resident queue is not being serviced at the desired level, wherein the removing comprises:
       allocating storage for the one or more messages to be removed; and
       copying the one or more messages from the memory resident queue to the allocated storage.

11. The method of claim 10, further comprising:
    identifying the one or more messages being copied with an identifier; and
    chaining the identifier to a swept list of the memory resident queue.

12. The method of claim 10, wherein the removing further comprises writing the one or more messages from the allocated storage to at least one storage medium.

13. The method of claim 10, wherein an amount of storage to be allocated is based, at least in part, from where in the memory resident queue the one or more messages are to be removed.

14. The method of claim 13, wherein the one or more messages are to be removed from a tail of the memory resident queue, and wherein the allocating comprises allocating storage for a total number of messages minus a defined number in the tail of the memory resident queue.

15. The method of claim 13, wherein the one or more messages are to be removed from a head of the memory resident queue, and wherein the allocating comprises allocating storage for half a number of get messages being serviced or for a total number of messages minus a defined number in the head of the memory resident queue.

16. The method of claim 1, wherein said determining is performed at one or more time intervals.

17. A system of managing memory resident queues, said system comprising:
    means for determining whether a memory resident queue is being serviced at a desired level;
    means for removing one or more messages from the memory resident queue to storage in response to a determination that the memory resident queue is not being serviced at the desired level; and
    means for returning at least one message of the one or more removed messages to the memory resident queue;
    wherein the at least one message comprises a set of one or more messages associated with a selected swept identifier.

18. The system of claim 17, wherein the removing of the one or more messages causes one or more resources associated with the memory resident queue to be freed.

19. The system of claim 17, wherein the returning is performed in response to a determination that the memory resident queue can accept additional messages.

20. The system of claim 17, wherein the desired level takes into consideration a fullness level of the memory resident queue.

21. A system of managing memory resident queues, said system comprising:
    means for determining whether a memory resident queue is being serviced at a desired level, wherein the means for determining comprises:
       means for determining whether a size of at least one component of the memory resident queue satisfies a first criterion; and
       means for determining whether a specified portion of messages of a defined type satisfies a second criterion, wherein the memory resident queue is not being serviced at the desired level when the first and second criterion are satisfied; and
    means for removing one or more messages from the memory resident queue in response to a determination tat the memory resident queue is not being serviced at the desired level.

22. The system of claim 21, wherein the at least one component comprises at least one of a head of the memory resident queue and a tail of the memory resident queue.

23. The system of claim 22, wherein the first criterion comprises being greater than a defined limit of the memory resident queue.

24. The system of claim 21, wherein the specified portion of messages of the defined type comprises one half of a number of get messages.

25. The system of claim 24, wherein the second criterion comprises being less than at least one of a size of a head of the memory resident queue and a size of a tail of the memory resident queue.

26. A system of managing memory resident queues, said system comprising:
  means for determining whether a memory resident queue is being serviced at a desired level; and
  means for removing one or more messages from the memory resident queue to storage in response to a determination that the memory resident queue is not being serviced at the desired level, wherein the means for removing comprises:
    means for allocating storage for the one or more messages to be removed; and
    means for copying the one or more messages from the memory resident queue to the allocated storage.

27. The system of claim 26, further comprising:
  means for identifying the one or more messages being copied with an identifier; and
  means for chaining the identifier to a swept list of the memory resident queue.

28. The system of claim 26, wherein the means for removing further comprises means for writing the one or more messages from the allocated storage to at least one storage medium.

29. The system of claim 26, wherein an amount of storage to be allocated is based, at least in part, from where in the memory resident queue the one or more messages are to be removed.

30. The system of claim 29, wherein the one or more messages are to be removed from a tail of the memory resident queue, and wherein the means for allocating comprises means for allocating storage for a total number of messages minus a defined number in the tail of the memory resident queue.

31. The system of claim 29, wherein the one or more messages are to be removed from a head of the memory resident queue, and wherein the means for allocating comprises means for allocating storage for half a number of get messages being serviced or for a total number of messages minus a defined number in the head of the memory resident queue.

32. The system of claim 17, wherein said means for determining comprises performing the determining at one or more time intervals.

33. At least one program storage device readable by a machine, tangibly embodying at least one program of instructions executable by the machine to perform a method of managing memory resident queues, said method comprising:
  determining whether a memory resident queue is being serviced at a desired level;
  removing one or more messages from the memory resident queue to storage in response to a determination that the memory resident queue is not being serviced at the desired level; and
  returning at least one message of the one or more removed messages to the memory resident queue;
  wherein the at least one message comprises a set of one or more messages associated with a selected swept identifier.

34. The at least one program storage device of claim 33, wherein the removing of the one or more messages causes one or more resources associated with the memory resident queue to be freed.

35. The at least one program storage device of claim 33 wherein said returning is performed in response to a determination that the memory resident queue can accept additional messages.

36. The at least one program storage device of claim 33, wherein the desired level takes into consideration a fullness level of the memory resident queue.

37. At least one program storage device readable by a machine, tangibly embodying at least one program of instructions executable by the machine to perform a method of managing memory resident queues, said method comprising:
  determining whether a memory resident queue is being serviced at a desired level, the determining comprising:
    determining whether a size of at least one component of the memory resident queue satisfies a first criterion; and
    determining whether a specified portion of messages of a defined type satisfies a second criterion, wherein the memory resident queue is not being serviced at the desired level when the first and second criterion are satisfied; and
  removing one or more messages from the memory resident queue in response to a determination that the memory resident queue is not being serviced at the desired level.

38. The at least one program storage device of claim 37, wherein the at least one component comprises at least one of a head of the memory resident queue and a tail of the memory resident queue.

39. The at least one program storage device of claim 38, wherein the first criterion comprises being greater than a defined limit of the memory resident queue.

40. The at least one program storage device of claim 37, wherein the specified portion of messages of the defined type comprises one half of a number of get messages.

41. The at least one program storage device of claim 40, wherein the second criterion comprises being less than at least one of a size of a head of the memory resident queue and a size of a tail of the memory resident queue.

42. At least one program storage device readable by a machine, tangibly embodying at least one program of instructions executable by the machine to perform a method of managing memory resident queues, said method comprising:
  determining whether a memory resident queue is being serviced at a desired level; and
  removing one or more messages from the memory resident queue to storage in response to a determination that the memory resident queue is not being serviced at the desired level, wherein the removing comprises:
    allocating storage for the one or more messages to be removed; and
    copying the one or more messages from the memory resident queue to the allocated storage.

43. The at least one program storage device of claim 42, wherein said method further comprises:
  identifying the one or more messages being copied with an identifier; and chaining the identifier to a swept list of the memory resident queue.

44. The at least one program storage device of claim 42, wherein the removing further comprises writing the one or more messages from the allocated storage of at least one storage medium.

45. The at least one program storage device of claim 42, wherein an amount of storage to be allocated is based, at least in part, from where in the memory resident queue the one or more messages are to be removed.

46. The at least one program storage device of claim 45, wherein the one or more messages are to be removed from a tail of the memory resident queue, and wherein the allocating comprises allocating storage for a total number of messages minus a defined number in the tail of the memory resident queue.

47. The at least one program storage device of claim 45, wherein the one or more messages are to be removed from a head of the memory resident queue, and wherein the allocating comprises allocating storage for half a number of get messages being serviced or for a total number of messages minus a defined number in the head of the memory resident queue.

48. The at least one program storage device of claim 33, wherein said determining is performed at one or more time intervals.

* * * * *

UNITED STATES PATENT AND TRADEMARK OFFICE
CERTIFICATE OF CORRECTION

PATENT NO. : 7,068,604 B2 Page 1 of 1
APPLICATION NO. : 09/938031
DATED : June 27, 2006
INVENTOR(S) : Chen et al.

It is certified that error appears in the above-identified patent and that said Letters Patent is hereby corrected as shown below:

Col.8, line 60, delete "tat" and insert --that-- at the beginning of the line

Signed and Sealed this

Twelfth Day of September, 2006

JON W. DUDAS
*Director of the United States Patent and Trademark Office*